(12) United States Patent
Laenen et al.

(10) Patent No.: US 8,128,254 B2
(45) Date of Patent: Mar. 6, 2012

(54) FLUSH-MOUNTED FLASHING LIGHT

(75) Inventors: Guy Laenen, Westerlo (BE); Michel Vanderen, Woluwe-Saint-Pierre (BE); Jean-Claude Vandevoorde, Steenkokkerzeel (BE); Louis Willems, Landen (BE)

(73) Assignee: ADB BVBA (BE)

( * ) Notice: Subject to any disclaimer, the term of this patent is extended or adjusted under 35 U.S.C. 154(b) by 592 days.

(21) Appl. No.: 12/083,251

(22) PCT Filed: Oct. 9, 2006
(Under 37 CFR 1.47)

(86) PCT No.: PCT/EP2006/067177
§ 371 (c)(1),
(2), (4) Date: Apr. 24, 2009

(87) PCT Pub. No.: WO2007/042491
PCT Pub. Date: Apr. 19, 2007

(65) Prior Publication Data
US 2010/0053946 A1 Mar. 4, 2010

(30) Foreign Application Priority Data
Oct. 10, 2005 (DE) .......................... 10 2005 048 907

(51) Int. Cl.
*E01F 9/04* (2006.01)
(52) U.S. Cl. ..................... 362/153.1; 362/153; 362/145; 362/470; 362/471
(58) Field of Classification Search .................. 362/153, 362/153.1, 470, 471, 218, 221, 224, 145
See application file for complete search history.

(56) References Cited

U.S. PATENT DOCUMENTS
3,327,104 A 6/1967 Loch
(Continued)

FOREIGN PATENT DOCUMENTS
DE 1 180 696 11/1960
(Continued)

OTHER PUBLICATIONS
"Blitzfeuer mit Vorschaltgerät für Anflug und Schwelle", A.02.612d, herausgegeben 1999, Siemens AG, Bestell-Nr. E10001-T95-A65-V1.

*Primary Examiner* — Anabel Ton
(74) *Attorney, Agent, or Firm* — Tucker Ellis & West LLP

(57) ABSTRACT

The invention relates to a flush-mounted flashing light for approach guidance of aircraft, having a housing which has a housing pot (10) which can be inserted below ground level (F) and a housing cover (12) which covers this approximately at ground level (F) and having an optical system, which is arranged in the housing for controlled production and directed emission of light flashes, which comprises a light source (20) for production of light flashes and a prism (40) for varying the direction of the beam direction of the light flashes, with at least one light outlet opening (13) being provided in the housing cover (12) for light flashes to emerge from in a predetermined emission direction. The external dimensions as well as the total weight of the flashing light can be reduced considerably because the light source (20) is elongated and designed to emit a light over a length (L) of less than 100 mm, and because a lens (42) for focusing the light which is emitted from the light source (20) is arranged on a light inlet surface (41) of the prism (40).

12 Claims, 2 Drawing Sheets

U.S. PATENT DOCUMENTS

| | | |
|---|---|---|
| 6,168,294 B1 | 1/2001 | Erni et al. |
| 6,259,675 B1 * | 7/2001 | Honda .......................... 370/248 |
| 7,168,825 B2 * | 1/2007 | McArthur ..................... 362/267 |
| 7,234,892 B2 * | 6/2007 | Raaijmakers et al. ............ 404/9 |
| 7,344,266 B2 * | 3/2008 | Coman ..................... 362/153.1 |
| 7,476,006 B2 * | 1/2009 | Hinds ........................... 362/286 |

FOREIGN PATENT DOCUMENTS

| | | |
|---|---|---|
| EP | 1 233 234 A2 | 8/2002 |
| GB | 2 178 230 A | 2/1987 |
| WO | WO 97/44611 A1 | 11/1997 |
| WO | WO 03/031098 A2 | 4/2003 |

* cited by examiner

FLUSH-MOUNTED FLASHING LIGHT

CROSS REFERENCE TO RELATED APPLICATIONS

This application is the US National Stage of International Application No. PCT/EP2006/067177, filed Oct. 9, 2006 and claims the benefit thereof. The International Application claims the benefits of German application No. 10 2005 048 907.9 DE filed Oct. 10, 2005, both of the applications are incorporated by reference herein in their entirety.

FIELD OF INVENTION

The invention relates to a flush-mounted flashing light for approach guidance for aircraft.

BACKGROUND OF INVENTION

Flashing lights are used as additional approach and threshold identification lights at airports in poor weather conditions, when the effect of the normal approach lighting is not sufficient to guarantee good, visual approach guidance. However, it may also be expedient to additionally use flashing lights in good visibility conditions, for example in order to make it easier to find the runway in urban areas.

Flashing lights are used in precision approach lighting systems as a threshold flashing system or as a combined approach flashing and threshold flashing system, whose functionalities and characteristics are described in the International Civil Aviation Organization (ICAO) Standard, Annex 14, volume I, part 1, paragraph 5.3.4, and in the Federal Aviation Administration (FAA) Standard, AC5345-51, E-2628b. Flashing lights may be in the form of surface-mounted lights for one emission direction, in the form of surface mounted omnidirectional lights, or else in the form of flush-mounted lights for one emission direction.

The DCF-1-120 flush-mounted flashing light is known from the German product specification "Blitzfeuer mit Vorschaltgerät für Anflug und Schwelle" [Flashing light with a ballast for approach and threshold], issued in 1999 by Siemens AG, with the Order No. E10001-T95-A65-V1. Each flush-mounted flashing light has an associated ballast which contains the components for supplying and igniting a 2000 V DC voltage flash tube. The flash energy is stored in capacitors. A coded counter, which is located in each ballast for the known flashing light system and is synchronized by the timer in a master ballast, determines the subsequent pulse which ignites the lamps, and in response to which the capacitor discharges its energy as a light flash. Each flashing light system has an associated system control cabinet as an interface for control and monitoring of the flashing system. A six-core special cable is used for the electrical connection between the flush-mounted flashing light and the ballast and its length may be up to 30 m. The system control cabinet is used to drive the ballasts either remotely or in situ with one or with three brightness levels.

This known DCF-1-120 flush-mounted flashing light has a multiple part housing, which comprises a cylindrical housing pot which is closed from underneath by a housing base composed of cast aluminum alloy, and whose upper face is covered by an upper part which is in the form of a plate and surrounded concentrically by an outer ring, composed of cast steel. An optics assembly is arranged in the housing pot and has a xenon discharge lamp as the light source for production of light flashes, as well as lamp holders, rubber grommets, an ignition transformer, a locking switch and a terminal block. The aluminum highly-reflective mirror is used to guide the light produced by the discharge lamp in the direction of a prism, which is adhesively bonded in the housing upper part. The prism changes the direction of the beam direction of the light flashes, so that they leave the flashing light in a predetermined emission direction through light outlet openings in the housing upper part. The emission angle is horizontally (in azimuth) between +15° and −15° and vertically (in elevation) between +2° and +12°. The effective minimum light intensity of 150 Cd, 500 Cd or 5000 Cd is produced by light flashes with an energy of 60 J per flash, at a maximum power of 120 W. With an emission rate of two flashes per second produced by discharging a capacitor which is charged to 2000 V, a 100 mm long xenon gas-discharge tube is required to produce the power. Cadmium-plated steel is used for the large housing parts, while the small parts are composed of stainless steel. The DCF-1-120 flush-mounted flashing lights have a net weight of 50 kg, with the outer ring of the housing upper part weight of 18 kg. The diameter of the outer ring is 559 mm, the overall height 464 mm, while the projection of the housing upper part above ground level is 25.4 mm.

The loads which occur as a result of normal modern aircraft types landing on them, rolling over them or static loads should cause damage neither to the flush-mounted flashing light itself nor to aircraft undercarriages. One critical variable in this case is the projection of the housing cover above ground level. On the other hand, it is advantageous for simple and low-cost installation and maintenance for the flush-mounted flashing light to be as compact as possible and to be light in weight.

SUMMARY OF INVENTION

In one aspect of the invention it is thus based on an object of providing a flush-mounted flashing light of this generic type which is smaller and lighter than known flush-mounted flashing lights and at the same time, in particular, has a smaller projection.

According to the invention, the object is achieved for example by a flush-mounted flashing light of the type mentioned initially. Since an elongated light source is used, designed to emit light over a length of less than 100 mm, smaller diameters can be used for the housing pot. Since a lens for focusing of the light which is emitted from the light source is arranged on a light inlet surface of the prism, it is possible to design the lens/prism combination according to the invention to be smaller than the prisms which are known from the prior art. The light flashes from the high-light-intensity and relatively short light source are gathered by the lens arrangement and emitted with low losses in a predetermined emission direction by using the prism to vary the direction. The relatively small lens/prism combination makes it possible to reduce the size of the light outlet openings in the housing cover which in turn leads to a reduction in the projection above ground level. In addition to the reduction of the projection, the smaller design—in particular the lens/prism combination as well—results in a reduction in the total weight of the flush-mounted flashing light according to the invention. This makes it possible for the flush-mounted flashing light according to the invention to be carried by just one person, thus simplifying and reducing the cost of installation and maintenance efforts. The reduction in size furthermore allows applications which previously were not possible, for example installations embedded in a flat ground surface.

In one preferred embodiment of the flush-mounted flashing light according to the invention, the light source is in the form of a gas-discharge lamp with an electrode separation of less than 70 mm, for example 52 mm. Gas-discharge lamps are known as such from the prior art. They comprise a glass tube, which is generally filled with xenon with electrodes fused in at the ends. In order to produce the required light power, lamps with an electrode separation of 100 mm or more have been used until now. According to the invention, it was possible by increasing the pressure of the xenon noble gas filling to provide the light power required by the relevant standards, even with the electrode separation being shortened to 52 mm. In order to make it possible to trigger a light flash, a capacitor which is connected to the electrodes must first of all be charged. The ionization of the xenon filling gas is initiated by means of a high-voltage pulse. Surge ionization results in the discharge current rising within 0.1 ms to values of several hundred amperes, and in the capacitor being discharged. During this process, enormous power levels occur, briefly, in the range of from a few up to 100 kW. As a consequence, the pressure in the lamp rises and the spectrum is improved owing to the broadening of the spectral lines towards a quality level which is similar to daylight.

In one preferred refinement of the flush-mounted flashing light according to the invention, the lens and the prism are formed integrally, with the lens being integrally formed directly on the light inlet surface of the prism. This makes it possible to achieve two functions, specifically light focusing and beam direction changing, by a single component. In addition to manufacturing advantages, it is also possible to install one item more easily than two separate components, which would need to be held separately and adjusted with respect to one another. The combined lens/prism arrangement is, furthermore, more compact and is thus also lighter in weight, since this glass module contributes significantly to the total weight of the flush-mounted flashing light. In one preferred embodiment of the flush-mounted flashing light according to the invention, the maximum projection caused by the light outlet openings in the housing cover is 18 mm. The use of the compact lens/prism combination makes it possible to reduce the size of the light outlet openings in the housing cover. This allows a housing cover design whose projection above ground level does not exceed 18 mm. This in turn improves the behavior when aircraft roll over it as they are presented with a smaller obstruction.

In another preferred refinement of the flush-mounted flashing light according to the invention, a drive circuit for controlled production of light flashes is arranged in the housing. An internal drive such as this allows longer cable paths between the flashing light and the associated ballast, from where the drive has until now had to be provided, thus limiting the cable length.

In a further advantageous embodiment of the flush-mounted flashing light according to the invention, a colored filter is arranged in the beam path of the light flashes. The smaller design allows the optional use of a colored filter for coding of light signals. The production of colored light flashes is admittedly not specified in the relevant ICAO or FAA Standards, but is frequently required by the market.

In a further advantageous embodiment of the flush-mounted flashing light according to the invention, the housing cover and the housing pot are each formed integrally. This reduces the number of components of the flush-mounted flashing light according to the invention thus considerably simplifying assembly before initial installation, as well as after maintenance, thus reducing the production and maintenance costs.

In the case of a flush-mounted flashing light according to the invention, the housing pot and the housing cover are each preferably in the form of a casting. Aluminum die-casting has been particularly proven in this case.

In another preferred refinement of the flush-mounted flashing light according to the invention, cooling ribs are integrally formed on the housing pot. As a result of the more compact design, this allows the thermal energy that is emitted during the light flashes to be dissipated to the exterior from the housing. This prevents overheating of components and thus lengthens the life of a flush-mounted flashing light according to the invention.

BRIEF DESCRIPTION OF THE DRAWINGS

Further advantages of a flush-mounted flashing light according to the invention will become evident from an exemplary embodiment which will be described in more detail in the following text with reference to the drawings in which.

DETAILED DESCRIPTION OF INVENTION

Figure 1:
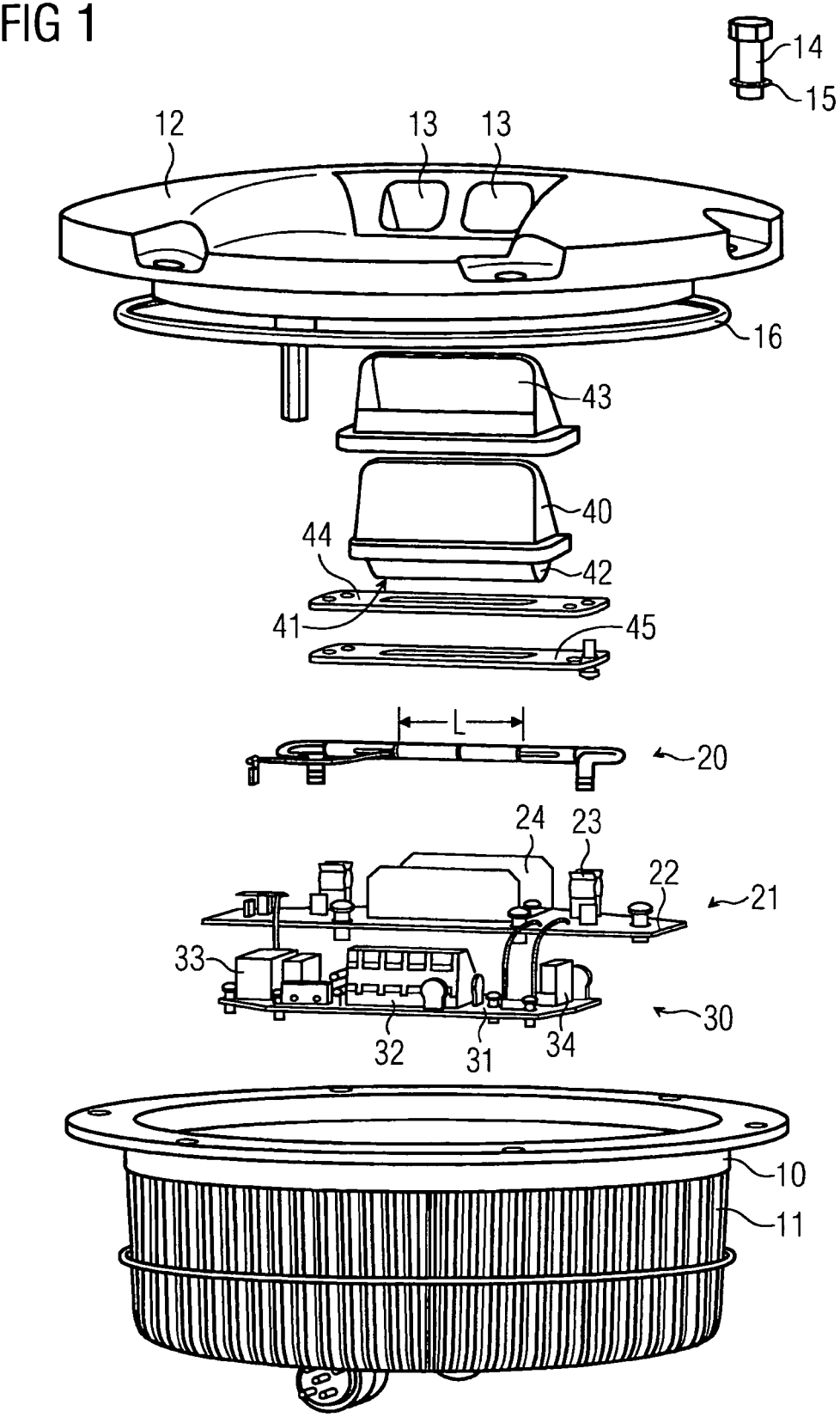
FIG. 1 shows a schematic exploded illustration of a flush-mounted flashing light according to the invention.
Figure 2:
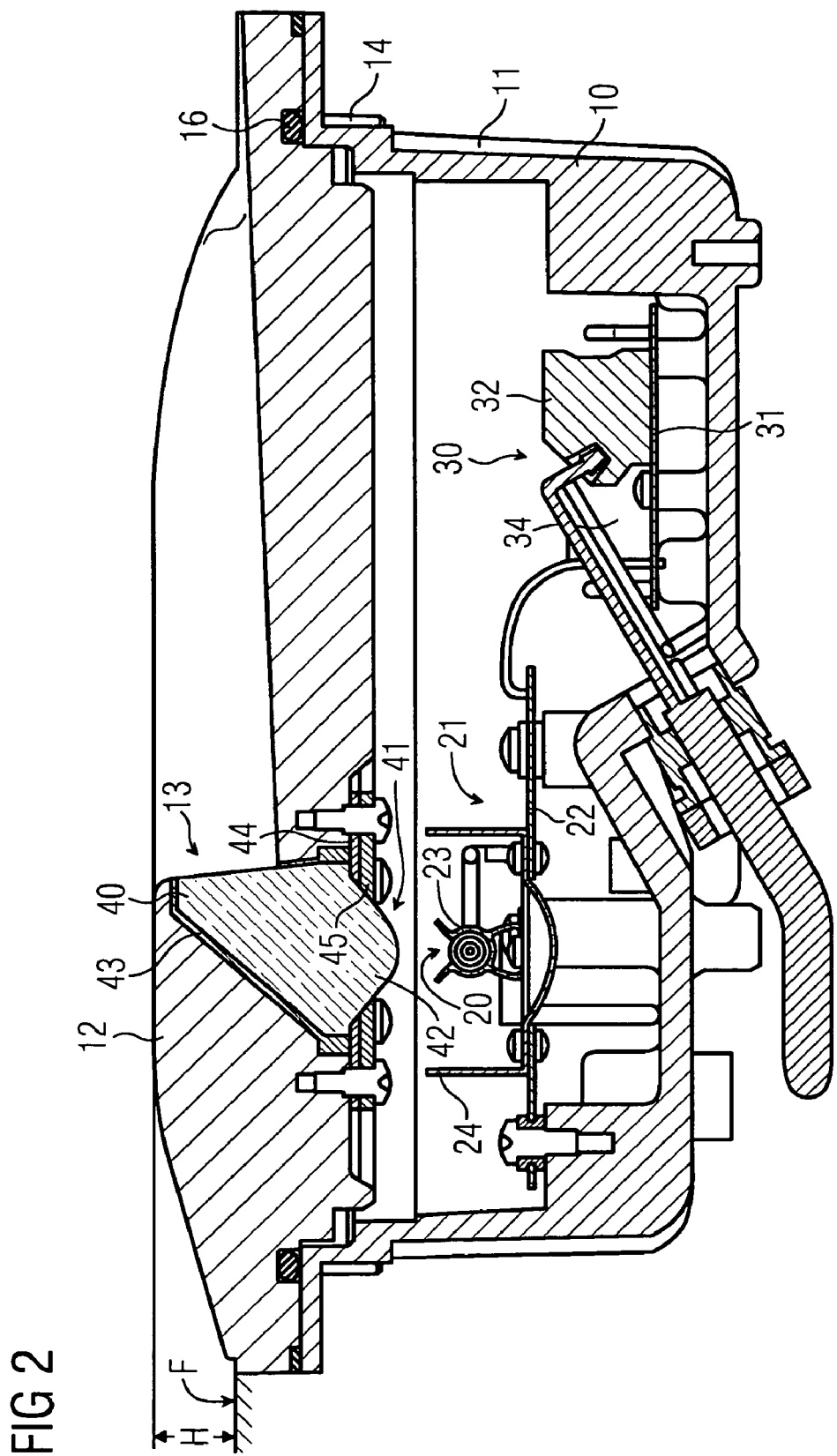
FIG. 2 shows a schematic cross section through a completely assembled flush-mounted flashing light.

A flush-mounted flashing light according to the invention for aircraft approach guidance to airports has a closed housing, as shown in FIG. 1 and FIG. 2. The housing comprises a housing pot 10 which can be inserted into a built-in pot, which is not illustrated but is arranged in the ground. A flange to which a housing cover 12 in the form of a plate can be fitted and can be secured by means of screws 14 and spring washers 15 is integrally formed on the upper edge of the housing pot 10. In order to seal the housing interior, a O sealing ring 16 is arranged on the housing pot 10 in the area of the contact surface with the housing cover 12. After installation of the flush-mounted flashing light in the field, the housing cover 12 is arranged approximately at ground level F, with a certain amount of projection H above ground level F.

An optical system for controlled production and directed emission of light flashes is arranged in the housing of the flush-mounted flashing light. The optical system comprises a light source 20 which is in the form of a gas-discharge lamp for production of light flashes. The arc length L, that is to say the electrode separation in the gas-discharge lamp 20, is, according to the invention, less than 70 mm, and preferably only about 52 mm. The required light intensity of the light flashes with an arc length L that is as short as this is achieved by means of an appropriately high operating pressure of the xenon filling gas. The light source 20 is connected via electrical plug-in contacts to a lamp-holder 21, which has two pairs of spring plates, which are mounted on a base plate 22, for fixing the glass tube of the light source 20. A mirror plate 24 with a U-shaped cross section is also arranged on the base plate 22 and surrounds that area L of the light source 20 that is designed to emit light, at the sides a spectrum from underneath. The base plate 22 of the lamp-holder 21 rests on mounting caps, which are integrally formed on the base of the housing pot 10, where it is screwed in, insulated by rubber grommets.

For controlled production of light flashes, the light source 20 is driven via a control assembly 30, which is supported via a base plate 31 on a screw cap, which is integrally formed on the base of the housing pot 10 and is connected to the optical system by means of electrical cables. A terminal block 32 for connection of external supply, control and monitoring cables is seated on the base plate 31. Furthermore, the control assembly 30 has an ignition transformer 33 as well as the actual drive circuit 34. The drive circuit 34 is in the form of a chip module and controls the sequence of pulses which ignite the gas-discharge lamp 20 in response to which a capacitor which stores the flash energy discharges its energy as light flashes.

On its lower face, the housing cover 12 has a recess in the form of a prism which, in the installed state, is located above the optical system with the light source 20. An optical prism 40 is fitted into this recess and is held by a reflector 43 which closely surrounds the prism 40. The reflector 43 may be in the form of a highly-reflective aluminum mirror. At its base, located at the bottom, the prism 40 has a light inlet surface 41 which is in the form of a convex, aspherical lens 42. The rear face of the prism 40 is inclined at about 45° to 50° to the horizontal base, while the front face of the prism 40, which has a light outlet surface, includes an angle of about 80° to 85° with the base. The reflector 43 has openings on the light inlet surface and light outlet surface of the prism 40. The lens/prism combination 42, 40 which is surrounded by the reflector 43 is secured in the housing cover 12 by a holding plate 45, which is firmly screwed to the lower face of the housing cover 12 via an essentially coincident seal 44. The seal 44 and the holding plate 45 have approximately congruent, rectangular apertures, through which the lens 42 projects downwards. The upper face of the housing cover 12, which is in the form of a discus, has an approximately radial depression at whose central end two windows are arranged, which form light outlet openings 13. The light outlet openings 13 overlap the light outlet surface, which is exposed by the reflector 43, on the steep front face of the prism 40.

The light of a light flash which is produced by the light source 20 falls on to the light inlet surface 41 of the lens 42 partially directly and partially reflected by the U-shaped mirror plate 24. The maximum light catchment is achieved by arranging the elongated light source 20 approximately at the focal point of the lens 42. The incident light is focused by the lens 42 and is reflected by the reflector 43 on the rear face of the prism 40 in such a way that it leaves the flashing light through the light outlet opening 13 and is emitted along the depression in the upper face of the housing cover 12, in the direction of a predetermined angle range.

The use of a gas-discharge lamp with a short arc length L of only about 52 mm as the light source 20, as well as a lens/prism combination 42, 40 which is small in comparison to the prior art result in a flush-mounted flashing light which has small external dimensions and is light in weight. For example, the external diameter of the housing cover 12 is only about 305 mm, while the overall physical height of the flush-mounted flashing light according to the invention is only about 161 mm. Because the prism 40 is smaller, the housing cover 12 now results in the projection H above ground level F being only 17.5 mm, which means a reduction of about 8 mm, or about 30% in comparison to the prior art. The reduced total weight resulting from this allows a flush-mounted flashing light according to the invention to be carried by just one person. This reduces installation and maintenance costs. The integral design of the housing cover 12 and the integral design of the housing pot 10 allow a flush-mounted flashing light according to the invention to be installed more quickly. Since the control assembly 30 has a drive circuit 34, the cable runs between the flashing light and the ballast can be designed to be considerably longer than was possible with known flashing lights. The housing cover 12 and the housing pot 10 are advantageously in the form of castings, for example aluminum die-castings. In this case, integrated cooling ribs 11 are integrally formed on the outside of the housing pot 10 and are used for heat dissipation of the thermal energy that occurs during production of light flashes. The present exemplary embodiment does not illustrate the fact, although this is obvious to a person skilled in the relevant art, that it is possible with the flush-mounted flashing light according to the invention to arrange a colored filter in the beam path of the light flashes. This makes it possible to produce colored light flashes, for coding of signals.

The invention claimed is:

1. A flush-mounted flashing light for approach guidance of aircraft, comprising:
   a housing which has a housing pot which can be inserted below ground level and a housing cover which covers this approximately at ground level, and;
   an optical system, which is arranged in the housing for controlled production and directed emission of light flashes, which comprises a light source for production of light flashes and a prism for varying the direction of the beam direction of the light flashes, with at least one light outlet opening being provided in the housing cover for light flashes to emerge from in a predetermined emission direction,
   wherein the light source is elongated and designed to emit a light over a length of less than 100 mm, the light source being formed of a gas-discharge lamp with an electrode separation of at most 70 mm, and wherein a lens for focusing the light which is emitted from the light source is arranged on a light inlet surface of the prism.

2. The flush-mounted flashing light as claimed in claim 1, wherein the lens and the prism are formed integrally, with the lens being integrally formed directly on the light inlet surface of the prism.

3. The flush-mounted flashing light as claimed in claims 1, wherein the housing cover covers the housing such that the housing cover is approximately at a ground level, when in operation, and wherein the light outlet openings project above the ground level at most about 18 mm.

4. The flush-mounted flashing light as claimed in claim 1, wherein a drive circuit for controlled production of light flashes is arranged in the housing.

5. The flush-mounted flashing light as claimed in claim 1, wherein a colored filter is arranged in the beam path of the light flashes.

6. The flush-mounted flashing light as claimed in claim 1, wherein the housing pot and the housing cover are each formed integrally.

7. The flush-mounted flashing light as claimed in claim 6, wherein the housing pot and the housing cover are each in the form of a casting.

8. The flush-mounted flashing light as claimed in claims 1, wherein cooling ribs are integrally formed on the housing pot.

9. The flush-mounted flashing light of claim 1, wherein the gas-discharge lamp is filled with Xenon gas.

10. The flush-mounted flashing light of claim 1, wherein the gas-discharge lamp is filled with a gas at an appropriately high operating pressure, such that the gas-discharge lamp is capable of producing a light intensity in conformity with the relevant FAA and/or ICAO standards.

11. The flush-mounted flashing light of claim 1, wherein the housing cover as an external diameter of about 305 mm.

12. The flush-mounted flashing light of claim 10, wherein the housing cover has an external diameter of about 305 mm.

* * * * *